Dec. 24, 1929.  I. D. GROAK  1,740,505
COOKING STOVE
Filed Sept. 2, 1927    2 Sheets-Sheet 1

Inventor

Irwin D. Groak.

Dec. 24, 1929.   I. D. GROAK   1,740,505
COOKING STOVE
Filed Sept. 2, 1927   2 Sheets-Sheet 2

Inventor
Irvin D. Groak

Patented Dec. 24, 1929

1,740,505

UNITED STATES PATENT OFFICE

IRWIN D. GROAK, OF CHICAGO, ILLINOIS

COOKING STOVE

Application filed September 2, 1927. Serial No. 217,132.

The invention relates to cooking stoves, and more particularly to that form of cooking stove which is provided with a baking or cooking chamber and a broiling chamber.

The main object of the invention is to provide, in a stove of the character described, means for automatically withdrawing the vessel containing the food from the cooking or broiling chamber when the door is opened so that the contents of the vessel may be conveniently inspected, or the vessel conveniently removed by the cook without likelihood of suffering any burns from contact with the walls of the cooking or broiling chamber, and additional means operating to automatically move the vessel back into the chamber when the door is closed.

A still further object of the invention is to provide, in a stove of the character described, a novel and improved supporting means slidably mounted in the cooking or broiling chambers for supporting the vessel containing the food, and means for automatically withdrawing a portion of said supporting means from the cooking or broiling chamber when the door is opened so that the contents of the vessel may be conveniently inspected or the vessel conveniently removed.

A still further object of the invention is to provide, in a stove of the character described, a novel and improved supporting means slidably mounted in the cooking or broiling chamber for supporting the vessel containing the food, means for automatically withdrawing a portion of said supporting means from the cooking or broiling chamber when the door is opened a predetermined amount, and means for automatically moving said supporting means back into the chamber when the door is closed.

A still further object of the invention is to provide in a stove of the character described, an improved and novel supporting means slidably sustained in the cooking or broiling chamber for supporting the vessel containing the food, and means for automatically withdrawing a portion of said supporting means from the chamber when the door is opened, and for automatically moving said supporting means back into the chamber when the door is closed, said means being operable only after the initial movement of the door in either direction.

A still further object of the invention is to provide means of the character described which will be simple, cheap to manufacture, and easily and readily attached to the cooking or broiling chamber of a stove of the character described for efficiently carrying out the purpose for which it is designed.

With the foregoing and other objects in view, which will appear as the description proceeds, my invention consists in the construction, arrangement and combination of parts of my apparatus whereby the objects contemplated are attained, as hereinafter more fully set forth, pointed out in the appended claims, and illustrated in the accompanying drawings, in which:

Figure 1:
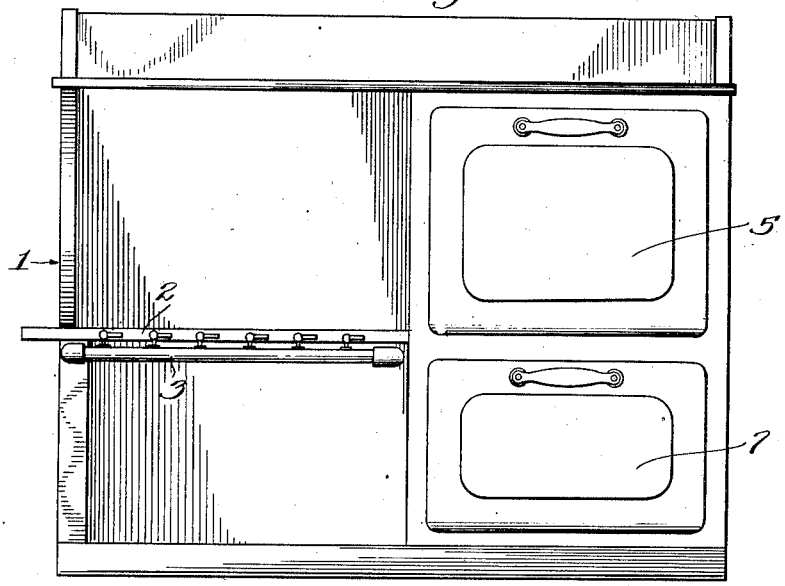
Fig. 1, is a front elevational view of a stove of the character described having my invention embodied therein.

In carrying my invention into effect in the embodiments, which I have selected for illustration in the accompanying drawings, and description in this specification, I provide a vessel supporting structure of any form suitable for the purpose and adapted to be slidably mounted in the baking or broiling chamber of a stove of the character described. The baking or broiling chambers in stoves of this nature are provided with several pairs of opposed ledges upon any pair of which may be supported baking or broiling pans or trays, and it is on a pair of these opposed ledges that my novel vessel supporting means may be mounted for sliding movement thereon.

The reference character 1, designates a gas stove of well known construction, said stove having a cooking range 2, a gas manifold 3, a cooking or baking chamber 4, the front of which is closed by a door 5 hinged at its lower end, and a broiling chamber 6, the front of which is also closed by a door 7, hinged at its lower end. As the stove as a whole is of a well known construction and forms no part of the present invention, it is not necessary to describe the same in detail.

Figure 2:
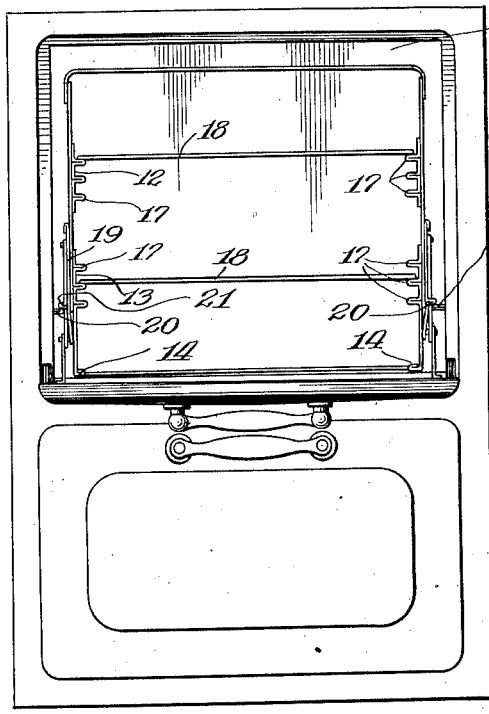
Fig. 2, is a front elevational view of the cooking or baking chamber with the door in its full open position and showing the vessel supporting means disposed therein.
Figure 3:
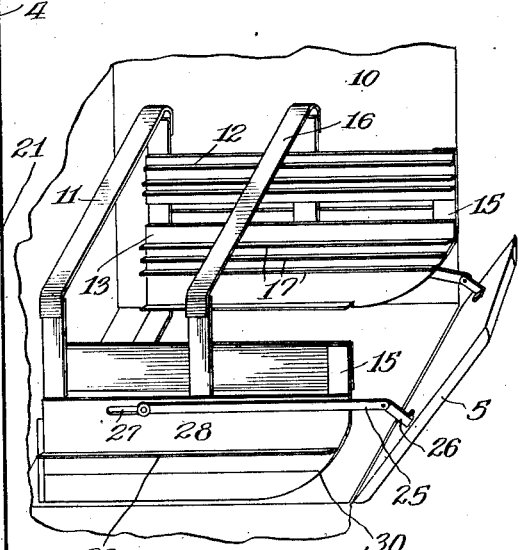
Fig. 3, is a view in perspective of the vessel supporting means disposed in the baking chamber with the front door partly opened.
Figure 4:
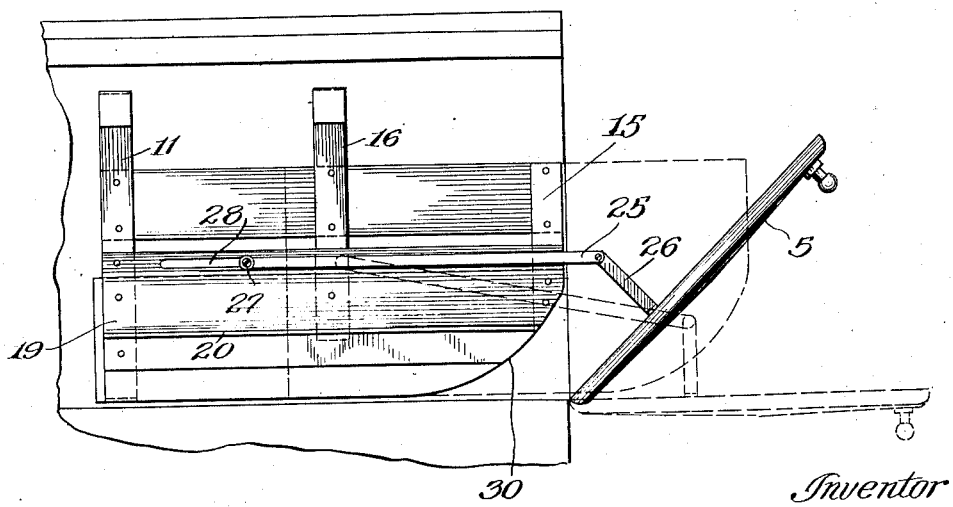
Fig. 4, is a side elevational view of the vessel supporting means disposed in the baking chamber with the door partly opened, and showing in dash and dot lines the supporting means in its withdrawn position when the door is in its full opened position.

Referring particularly to Figs. 2, 3 and 4, the reference character 10 designates generally my improved vessel supporting structure, said structure may comprise a rectangular rear frame member 11, said member being of substantially the same shape as the vertical cross section of the chamber 4 and is of such size that it may be loosely received in the chambers, and is of a material thick enough to make it substantially rigid. To the inner face of the side members of said frame member 11 is rigidly secured by riveting, brazing, welding or in any other suitable manner, the ends of upper and lower side plates 12 and 13, said plates being spaced from each other, and the lowermost edge of the lower plate 13 extending downwardly to a point near the upper surface of the bottom of the chamber 4, when said frame structure 10 is in its proper position in the chamber 4, and is bent inwardly at right angles to form the inwardly extending flanges or opposed ledges 14, on which a pan or tray 18 may be supported. To the forward free ends of the side plates 12 and 13 are secured by riveting, brazing, welding or in any suitable manner, on the outer sides thereof, the members 15 for connecting the same together, the upper edges of said members 15 being on the same level with the upper edges of the upper plates 12. A substantially inverted U-shaped frame member 16 is provided intermediate the ends of the frame structure 10 for reinforcing the same, said frame member 16 having its downwardly extending sides rigidly secured by riveting, brazing, welding or in any other suitable manner to the outer sides of the side plates 12 and 13 near the center portions thereof. The upper horizontally disposed portion of the inverted U shaped member 16 is substantially on a level with the upper portion of the frame member 11, and said upper portions extend to a point near the lower surface of the top of the chamber 4 when the frame structure 10 is disposed within the chamber 4, so that the cooking space in the interior of the chamber 4 will not be materially reduced by placing the frame structure 10 therein. The plates 12 and 13 are crimped at several points intermediate their lower and upper edges to provide horizontally disposed inwardly extending flanges or opposed ledges 17, on any pair of which a tray or pan 18, may be supported.

Secured to the outer sides of the frame members 11, 15, 16 by riveting, brazing, welding or in any other suitable manner, are side plates 19, said plates extending from a point near the lower edge of the upper side plate 12 to a point above the lower edge of the lower plate 13, and is of substantially the same length as the side plate 13. The side plates 19 are crimped intermediate their upper and lower edges to form outwardly extending horizontally disposed flanges 20, which flanges are adapted to rest upon the opposed ledges 21 provided on the inner lining of the chamber 4, for slidably supporting the frame structure 10 in the chamber 4.

In practice, cooks are frequently burned in reaching into the oven to remove the vessels containing the cooked food from the oven, and the main feature of the present invention consists in providing mechanism for automatically withdrawing these vessels from the oven to avoid danger of injuring the operator. In the present case the vessels containing the food are supported on the pans or trays 18, which trays are supported on the opposed ledges provided therefor in the frame structure 10. The mechanism for automatically withdrawing the frame structure 10 comprises a connection between the door 5 and the frame structure, whereby the latter with the vessels thereon will be automatically withdrawn from the oven when the door is opened. This connection may comprise a link 25, the forward end of which is pivotally connected to the free end of a rod 26, the other end of which rod 26 is rigidly secured by means of a screw or the like to the door 5. The other end of the link 25, has pivotally secured thereto a horizontally disposed stud or pin 27, said stud or pin 27 extending through an elongated slot 28 provided in the plate 19, and in which slot the pin 27 is adapted to ride. The slot 28 is disposed on the plate 19 at a point opposite that of the space between the upper and lower side plates 12 and 13. The slot 28 is of such a length and provided at such a point in the plate 19 that upon the initial movement of the door from its fully closed position to that shown in full lines in Fig. 4 of the drawings, the stud or pin 27 will ride therein without engaging the forward end wall thereof, thus causing no forward movement of the frame structure 10. However, upon further movement of the door towards its full opened position the pin or stud 27 will engage the forward end wall of the slots 28 causing the withdrawal of the frame structure 10 with the vessels thereon, until the door 5 has been fully opened, at which time the frame structure 10 will have moved to the positions shown in dash and dot lines in Fig. 4. When in this position it will be noticed that the door 5 is in a substantially horizontal position, and that free and unobstructed access may be had to the vessels, containing the food, supported on the frame structure 10, for readily inspecting the contents of said vessels or for removing said vessels from said frame structure.

The lower forward end of the frame structure 10 is cut away as shown in the drawings to form the curved surface 30, said surface 30 being of such a curvature that upon the movement of the door 5 from its fully opened to its closed position, it will be engaged by the inner surface of the door and moved backwardly into the chamber 4, until at the time the door 5 is in fully closed position, the frame structure 10 will be completely disposed therein as shown in full line in Fig. 4 of the drawings.

Figure 5:
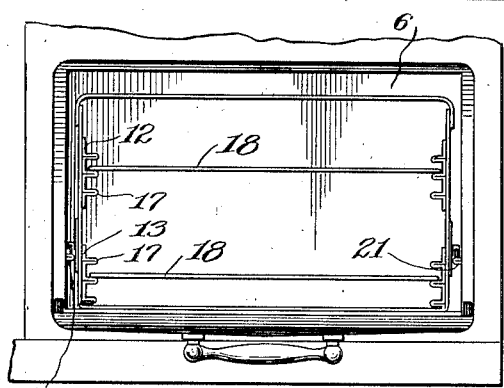
Fig. 5, is a front elevational view similar to Fig. 2 showing a modified form of supporting means for the broiling chamber.
Figure 6:
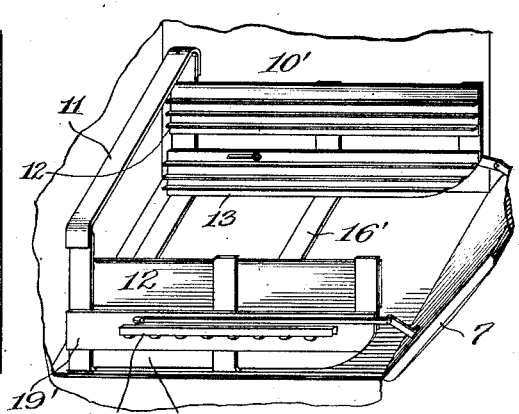
Fig. 6, is a view in perspective of the modified form of supporting means shown in Fig. 5, and Fig. 7, is a side elevational view of the modified supporting means showing the same disposed in the broiling chamber when the door is partly open, and showing in dash and dot lines the same in its withdrawn position when the door is in its full opened position.
Figure 7:
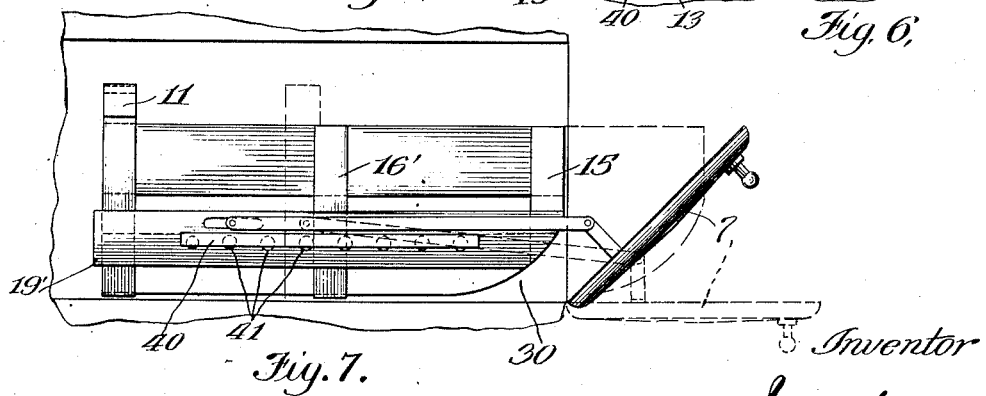

In the modification illustrated in Figs. 5, 6 and 7, the frame supporting structure is made so as to be adapted for use in the broiling chamber 6 of the stove 1. In the broiling chamber the heat or flame from the gas burners comes from the top of the chamber and for that reason the frame supporting structure in the modification is fully open at its top or upper face. The frame supporting structure 10', employed in the modification illustrated in Fig. 5, 6, and 7 is substantially the same as the frame structure 10, with the exception that instead of the inverted U shaped member 16 used in the frame structure 10, a substantially U shaped frame structure 16' is used, this frame member 16' having its side portions connected by riveting, brazing welding or in any other suitable manner, to the outer sides of the side plates 12 and 13, intermediate their ends, and the base portion of said U shaped frame member 16' extends across the bottom of the frame structure 10' for reinforcing or stiffening the same.

The means for slidably supporting the frame structure 10' in the chamber 6 is somewhat different from that used in the modification illustrated in Figs. 2, 3 and 4, this means, however may be employed in the first embodiment, and obviously, the sliding supporting means employed in Fig. 2, 3, and 4 may be used for supporting the frame structure 10'. The sliding supporting means may comprise a channeled member 40 rigidly secured by brazing, welding or in any other suitable manner to the outer sides of the side plates 19', said side plates 19' being similar to the plates 19. The channeled members 40 are provided with a series of rollers 41 mounted for rotation therein, which rollers 41 are adapted to ride on the opposed ledges 21, formed on the inner lining of the chamber 6. The mechanism for automatically withdrawing the frame structure 10' when the door 7 of the broiling chamber 6 is opened, is the same as that employed in the construction illustrated in Figs. 2, 3 and 4, also the means for causing the frame structure 10' to be moved back into the chamber 6 when the door 7 is moved from its fully opened to closed position is the same. This mechanism has been fully described hereinbefore and it is not necessary to describe the same further.

The advantages of my invention will be obvious from what has been said above concerning its construction and mode of operation. I may particularly enumerate the ease with which it may be attached to any stove of the character described, the cheapness of construction, the fact that when the frame structure is in its withdrawn position, the vessels supported thereby may be reached from the front or top or sides of the frame structure since the latter is open both at the front and at its top, and the further fact that the door for the chamber may be opened a slight amount without causing any movement of the vessel supporting structure. I do not limit myself to the exact forms described, as it will be evident that various other modifications might be made, without departing from the spirit and scope of the said invention. Also I do not limit myself to the use of my invention with a gas stove as illustrated in the drawings, as obviously the same may be employed with any form of stove or range, such for example as, gas, coal, oil, combination gas and coal, or electric. The device is adapted for use with any one of the above constructions of stoves or ranges.

Having thus described my invention, what I claim as new and desire to secure by Letters Patent of the United States is as follows:

1. In a stove, the combination with a chamber in said stove, and a front door hinged at one side thereof to said chamber, of a vessel supporting structure having a pair of upstanding side portions provided with horizontally disposed elongated slots, means for slidably sustaining said structure in said chamber, and connection between said door and said supporting structure whereby the latter will be automatically withdrawn from said chamber when the door is opened, said connection comprising a stud slidably received in said slot, a rod having one of its ends rigidly secured to said door, and a link connecting said stud and the free end of said rod.

2. In a stove, the combination with a chamber in said stove, and a front door hinged at one side thereof to said chamber, of a vessel supporting structure having a pair of upstanding side portions provided with horizontally disposed elongated slots, means for slidably sustaining said structure in said chamber, and a connection between said door and said supporting structure whereby the latter will be automatically withdrawn from said chamber when the door is opened, said connection comprising a stud slidably received in each of said slots, a rod having one of its ends rigidly secured to said door, and a link connecting said stud and the free end of said rod, and means formed on the front ends of said upstanding side portions of said vessel supporting structure adapted for engagement by said door when the latter is moved from its open position to its closed position whereby said vessel supporting structure will be moved back into the chamber when the door is closed.

3. In a stove, the combination with a chamber in said stove, and a front door hinged at one side thereof to said chamber, of a vessel supporting structure having a pair of upstanding side portions provided with horizontally disposed elongated slots, means for slidably sustaining said structure in said chamber, and a sliding connection between said door to said supporting structure whereby the latter will be automatically withdrawn from said chamber when the door is opened, and means comprising suitably curved portions formed integrally on the front ends of said upstanding side portions of said vessel supporting structure adapted to be engaged by said door when the latter is moved from its open position to its closed position whereby said vessel supporting structure will be caused to be moved back into the chamber by the closing movement of the door.

In testimony whereof I affix my signature.

IRWIN D. GROAK.